(12) United States Patent
Park et al.

(10) Patent No.: US 8,995,332 B2
(45) Date of Patent: Mar. 31, 2015

(54) RELAY NODE DEVICE FOR RECEIVING CONTROL INFORMATION FROM A BASE STATION AND METHOD THEREFOR

(71) Applicant: LG ELectronics Inc., Seoul (KR)

(72) Inventors: Kyu Jin Park, Gyeonggi-do (KR); Sung Ho Moon, Gyeonggi-do (KR); Jae Hoon Chung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/324,785

(22) Filed: Jul. 7, 2014

(65) Prior Publication Data

US 2014/0321356 A1 Oct. 30, 2014

Related U.S. Application Data

(63) Continuation of application No. 13/503,616, filed as application No. PCT/KR2010/007467 on Oct. 28, 2010, now Pat. No. 8,797,941.

(60) Provisional application No. 61/255,492, filed on Oct. 28, 2009, provisional application No. 61/324,313, filed on Apr. 15, 2010.

(30) Foreign Application Priority Data

Oct. 28, 2010 (KR) .................. 10-2010-0105952

(51) Int. Cl.
*H04W 72/14* (2009.01)
*H04W 72/04* (2009.01)
(Continued)

(52) U.S. Cl.
CPC .......... *H04W 72/0406* (2013.01); *H04B 7/155* (2013.01); *H04W 84/047* (2013.01)
USPC ............... 370/315; 370/252; 370/329; 455/7; 455/450

(58) Field of Classification Search
CPC .............. H04L 2001/0097; H04L 5/0055; H04L 1/1607; H04L 25/03866; H04L 5/0005; H04L 5/0094; H04B 7/14; H04W 72/042; H04W 84/047; H04W 72/0406; H04W 72/1278; H04W 88/04; H04W 72/005; H04W 72/04
USPC ................ 370/252, 315, 328, 329, 330, 336; 455/7, 9, 450
See application file for complete search history.

(56) References Cited

U.S. PATENT DOCUMENTS 8,477,633 B2   7/2013   Park et al.
8,649,281 B2   2/2014   Nam et al.
(Continued)

OTHER PUBLICATIONS

LG Electronics, "Consideration on Resource Allocation for Relay Backhaul Link" ; 3GPP TSG RAN WG1 Meeting #56 Athens, Greece, Feb. 9-13, 2009; R1-090790 ; 5 pages.*

(Continued)

*Primary Examiner* — Ahmed Elallam
(74) *Attorney, Agent, or Firm* — McKenna Long & Aldridge LLP

(57) ABSTRACT

The present invention relates to a relay node device for receiving control information from a base station and a method therefor. The relay node device according to the present invention comprises: a receiver, which receives information about an area where a relay-physical downlink control channel (R-PDCCH), the channel for transmitting control information for the relay node from a base station, is allocated; a processor, which searches for at least one R-PDCCH for the relay node based on the R-PDCCH allocation information received; and an R-PDCCH receiver, which receives the at least one R-PDCCH from the fourth symbol of the first slot in a downlink backhaul subframe of the area where the at least one R-PDCCH searched for by the processor has been allocated.

20 Claims, 7 Drawing Sheets

(51) Int. Cl.
*H04W 28/06* (2009.01)
*H04W 28/26* (2009.01)
*H04B 7/155* (2006.01)
*H04W 84/04* (2009.01)

(56) References Cited

U.S. PATENT DOCUMENTS

| | | | |
|---|---|---|---|
| 8,792,327 | B2 * | 7/2014 | Kim et al. .................... 370/208 |
| 8,797,941 | B2 * | 8/2014 | Park et al. .................... 370/315 |
| 8,885,575 | B2 * | 11/2014 | Yu et al. ........................ 370/329 |
| 2009/0196177 | A1 | 8/2009 | Teyeb et al. |
| 2010/0159935 | A1 | 6/2010 | Cai et al. |
| 2010/0246721 | A1 | 9/2010 | Chen et al. |
| 2010/0275083 | A1 | 10/2010 | Nam et al. |
| 2010/0316096 | A1 | 12/2010 | Adjakple et al. |
| 2011/0038303 | A1 * | 2/2011 | Ji et al. ......................... 370/315 |
| 2011/0051654 | A1 | 3/2011 | Blankenship et al. |
| 2011/0069637 | A1 | 3/2011 | Liu et al. |
| 2011/0103292 | A1 * | 5/2011 | Pasad et al. ................... 370/315 |
| 2011/0228883 | A1 | 9/2011 | Liu et al. |
| 2011/0249611 | A1 | 10/2011 | Khandekar et al. |
| 2012/0099518 | A1 | 4/2012 | Park et al. |
| 2012/0178360 | A1 * | 7/2012 | Park et al. ........................ 455/7 |
| 2012/0207082 | A1 | 8/2012 | Liu et al. |
| 2014/0161071 | A1 * | 6/2014 | Nam et al. .................... 370/329 |

OTHER PUBLICATIONS

3GPP RS 36.912 V9.0.0. "Feasibility Study for Further Advancements for E-UTRA (LTE Advanced)", Sep. 2009. See Section 9.3.3. "Backhaul resource assignment" (pp. 16-17).

J. Kotecha, et al., "LTE: MIMO Techniques in 3GPP-LTE", Nov. 5, 2008. See p. 15 and 19-20.

* cited by examiner (a)

(b)

RELAY NODE DEVICE FOR RECEIVING CONTROL INFORMATION FROM A BASE STATION AND METHOD THEREFOR

This application is a Continuation of, and claims the benefit of, U.S. patent application Ser. No. 13/503,616, filed Apr. 23, 2012, which is a 35 U.S.C. §371 National Stage entry of International Application No. PCT/KR2010/007467, filed Oct. 28, 2010, and claims the benefit of U.S. Provisional Application No. 61/255,492, filed Oct. 28, 2009 and U.S. Provisional Application No. 61/324,313, filed Apr. 15, 2010, and Korean Application No. 10-2010-0105952, filed Oct. 28, 2010, all of which are incorporated by reference in their entirety herein.

TECHNICAL FIELD

The present invention relates to a wireless communication, and more particularly, to a relay node device for receiving control information from a base station and method therefor.

BACKGROUND ART

In case that a channel status between an eNode B and a user equipment, a relay node (RN) is installed between the eNode B and the user equipment, thereby providing the user equipment with a radio channel having a better channel status. Moreover, by introducing a relay node into a cell edge area having a poor channel status from an eNode B, if the relay node is used, it may provide a faster data channel and extend a cell service area. Thus, a relay node is the technology introduced to solve a radio wave shadow area problem and is widely used.

Compared to a conventional relay node having a function limited to a function of a repeater configured to simply amplify and transmit a signal, a recent relay node is evolved into a further-intellectual form. Moreover, the relay node technology corresponds to the technology essential to service coverage extension and data throughput improvement as well as cost reductions for base station expansion and backhaul network maintenance in a next generation mobile communication system. To keep up with the ongoing development of the relay node technology, it is necessary for a new wireless communication system to support a relay node used by the related art wireless communication system.

In 3GPP LTE-A system, a relay node is defined to transmit a signal to an eNode B via an uplink backhaul subframe and is also defined to receive a signal from the eNode B via a downlink backhaul subframe. However, any frame structure for transceiving control information between a relay node and an eNode B has not been proposed in detail yet.

DISCLOSURE OF THE INVENTION

Technical Tasks

One object of the present invention is to provide a method for a relay node to receive control information from an eNode B.

Another object of the present invention is to provide a relay node device for receiving control information from an eNode B.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving control information, which is received by an eNode B from a relay node, according to the present invention may include the steps of receiving information on a region, to which R-PDCCH (relay-physical downlink control channel) for transmitting the control information for the relay node is assigned, from the eNode B, searching for at least one R-PDCCH for the relay node based on the received information, and receiving the at least one R-PDCCH by starting from a fourth symbol of a first slot in a downlink backhaul subframe of the region, to which the searched at least one R-PDCCH is assigned.

In the at least one R-PDCCH receiving step, the relay node may receive a DL grant including R-PDSCH (relay-physical downlink shared channel) resource allocation information and transmission format information through the fourth symbol to a seventh symbol of the first slot in the downlink backhaul subframe.

In the at least one R-PDCCH receiving step, the relay node may receive a UL grant including R-PUSCH (relay-physical uplink shared channel) resource allocation information in a second slot interval of the downlink backhaul subframe. Alternatively, in the at least one R-PDCCH receiving step, the relay node may receive a UL grant including R-PUSCH (relay-physical uplink shared channel) resource allocation information in a second slot interval of a downlink backhaul subframe assigned to a physical resource block (PRB) having a frequency band different from that of the down backhaul subframe.

The R-PDCCH assigned region may be configured by a physical resource block (PRB) unit.

The information on the R-PDCCH assigned region may be received from the eNode B by a higher layer signaling. And, the R-PDCCH assigned region may be semi-statically configured by the eNode B.

To further achieve these and other advantages and in accordance with the purpose of the present invention, a relay node apparatus for receiving control information from a eNode B, according to the present invention may include a receiver configured to receive information on a region, to which R-PDCCH (relay-physical downlink control channel) for transmitting the control information for the relay node is assigned, from the eNode B, a processor configured to search for at least one R-PDCCH for the relay node based on the received information, and the receiver is further configured to receive the at least one R-PDCCH from a fourth symbol of a first slot in a downlink backhaul subframe of the region, to which the searched at least one R-PDCCH is assigned.

The receiver is further configured to receive the at least one R-PDCCH further may receive a DL grant including R-PDSCH (relay-physical downlink shared channel) resource allocation information and transmission format information through the fourth symbol to a seventh symbol of the first slot in the downlink backhaul subframe.

The receiver is further configured to receive the at least one R-PDCCH further may receive a UL grant including R-PUSCH (relay-physical uplink shared channel) resource allocation information in a second slot interval of the downlink backhaul subframe. Alternatively, the receiver receiving the at least one R-PDCCH may further receive a UL grant including R-PUSCH (relay-physical uplink shared channel)

resource allocation information in a second slot interval of a downlink backhaul subframe assigned to a physical resource block (PRB) having a frequency band different from that of the down backhaul subframe.

The R-PDCCH assigned region may be configured by a physical resource block (PRB) unit.

The information on the R-PDCCH assigned region may be received from the eNode B by a higher layer signaling. And, the R-PDCCH assigned region may be semi-statically configured by the eNode B.

Advantageous Effects

According to the present invention, a relay node device efficiently receives control information from an eNode B, thereby enhancing performance of communication with the eNode B.

In particular, a relay node may be able to efficiently receive control information using an assigned position of R-PDCCH transmitted by containing control information for the relay node, a start point, an end point, multiplexing type information and the like.

According to various embodiments of the present invention, an eNode B and a relay node become aware of a UL backhaul subframe structure through signaling and the like, thereby efficiently performing communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Moreover, a relay may be named one of a relay node (RN), a relay station (RS), a relay and the like.

In a mobile communication system, a user equipment/relay node is able to receive information in downlink and is able to transmit information in uplink as well. Informations transmitted or received by the user equipment/relay node may include various kinds of data and control informations. In accordance with types and usages of the informations transmitted or received by the user equipment/relay node, various physical channels may exist.

Figure 1:
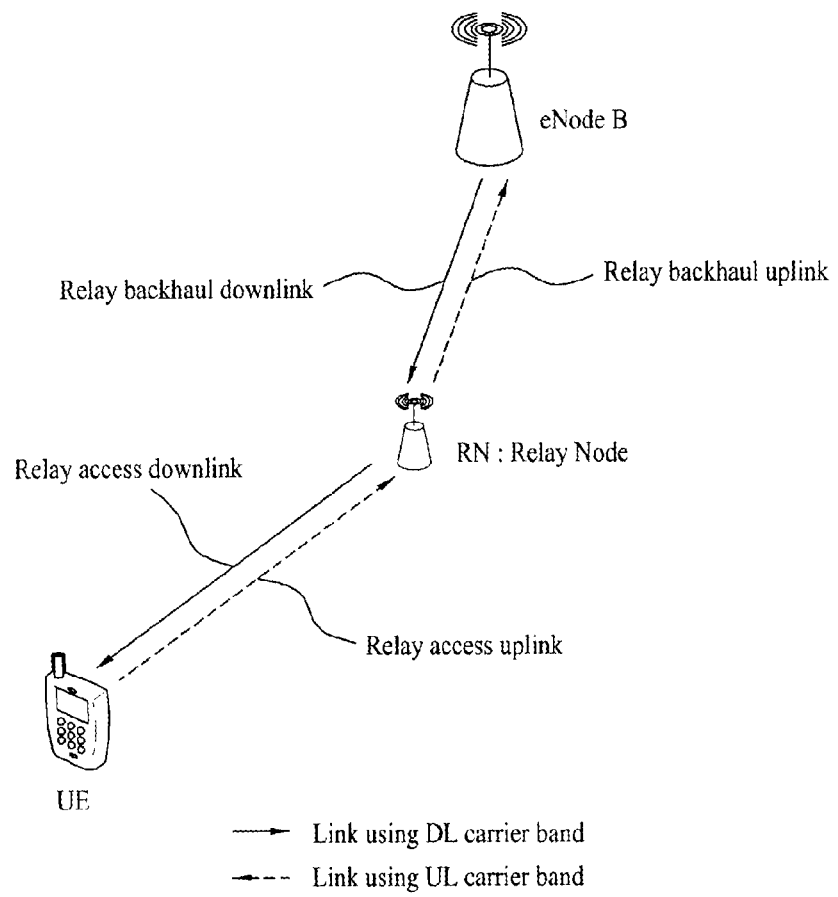
FIG. 1 is a diagram for configurations of a relay backhaul link and a relay access link in a wireless communication system.

FIG. 1 is a diagram for configurations of a relay backhaul link and a relay access link in a wireless communication system.

In 3GPP LTE-A ($3^{rd}$ Generation Partnership Project Long Term Evolution-Advanced) system, as a relay node is introduced to play a role of forwarding a link between an eNode B and a user equipment, links of two types differing from each other in attribute are applied to a UL carrier frequency band and a DL carrier frequency band, respectively. A connection link part established between an eNode B and a relay node is represented in a manner of being defined as a backhaul link. If transmission is performed by FDD (frequency division duplex)) or TDD (time division duplex) using a DL resource, it may be represented as a backhaul downlink. If transmission is performed by FDD or TDD using a UL resource, it may be represented as a backhaul uplink.

On the other hand, a connection link part established between a relay node and user equipments is represented in a manner of being defined as a relay access link. If transmission is performed via a relay access link using a DL frequency band (in case of FDD) or a resource of a DL subframe (in case of TDD), it may be represented as an access downlink. If transmission is performed via a relay access link using a UL frequency band (in case of FDD) or a resource of a UL subframe (in case of TDD), it may be represented as an access uplink.

A relay node (RN) may receive information from an eNode B in relay backhaul downlink or transmit information to the eNode B in relay backhaul uplink. The relay node may transmit information to a user equipment in relay access downlink or receive information from the user equipment in relay access uplink.

A relay node may be able to perform such an initial cell search as a job of matching synchronization with an eNode B and the like. To this end, the relay node may receive a synchronization channel from the eNode B, match synchronization with the eNode B, and then acquire such information as cell ID and the like. Subsequently, the relay node may be able to acquire intra-cell broadcast information by receiving a physical broadcast channel from the eNode B. Meanwhile, in the step of the initial cell search, the relay node may check a channel status of a relay backhaul downlink by receiving a relay backhaul downlink reference signal. In addition, the relay node may be able to detailed system information by receiving R-PDCCH (Relay-Physical Downlink Control CHannel) and/or R-PDSCH (Relay-Physical Downlink Shared CHannel).

Meanwhile, if an eNode B is initially accessed or a radio resource for signal transmission is absent, a relay node may perform a random access procedure. To this end, the relay node may transmit a preamble via a physical random access channel (PRACH) or the like and then receive a response message in response to the random access via R-PDCCH or a corresponding R-PDSCH.

In case of a contention based random access except a case of handover, it may be able to perform such a contention resolution procedure as a transmission of an additional physical random access channel, an R-PDCCH/R-PDSCH reception.

After completion of the above-described procedures, the relay node may perform such a general UL/DL signal transmission procedure as R-PDCCH/R-PDSCH and R-PUSCH/R-PUCCH (Relay-Physical Uplink Shared CHannel/Relay-Physical Uplink Control CHannel) transmission.

In doing so, control information, which is transmitted to the eNode B in uplink by the relay node or received from the relay node by the eNode B, may include one of ACK/NACK signal, CQI (Channel Quality Indicator), PMI (Precoding Matrix Index), RI (Rank Indicator) and the like. In case of 3GPP LTE ($3^{rd}$ Generation Partnership Project Long Term Evolution) LTE-A system, a relay node may be able to transmit such control information as CQI, PMI, RI and the like on R-PUSCH/R-PUCCH.

Figure 2:
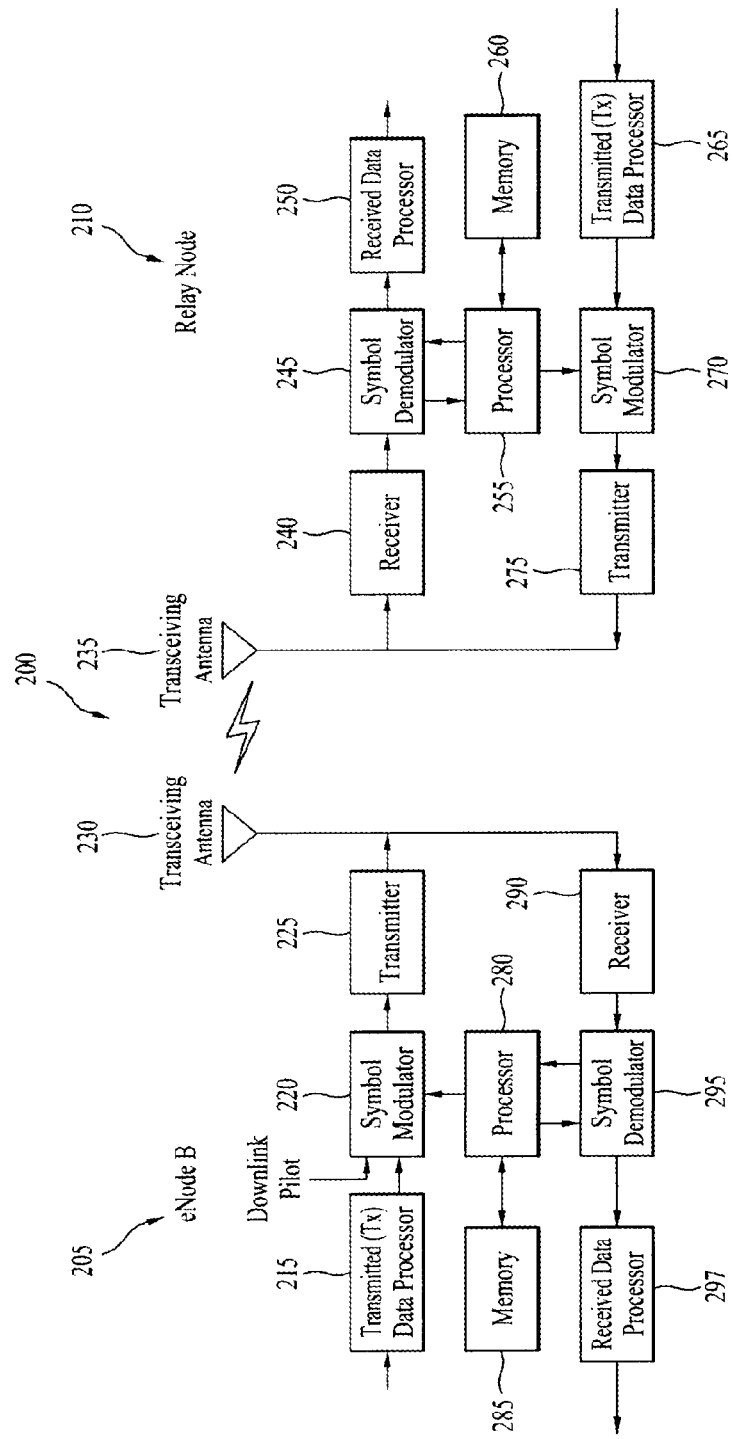
FIG. 2 is a block diagram for configurations of an eNode B 205 and a relay node 210 in a wireless communication system 200.

FIG. 2 is a block diagram for configurations of an eNode B 205 and a relay node 210 in a wireless communication system 200.

Although one eNode B 205 and one relay node 210 are shown in the drawing to schematically represent a wireless communication system 200, the wireless communication system 200 may include at least one eNode B and/or at least one relay node.

Referring to FIG. 2, an eNode B 205 may include a transmitted (Tx) data processor 215, a symbol modulator 220, a transmitter 225, a transceiving antenna 230, a processor 280, a memory 285, a receiver 290, a symbol demodulator 295 and a received data processor 297. And, a relay node 210 may include a transmitted (Tx) data processor 265, a symbol modulator 270, a transmitter 275, a transceiving antenna 235, a processor 255, a memory 260, a receiver 240, a symbol demodulator 245 and a received data processor 250. Although the eNode B/relay node 205/210 includes one antenna 230/235 in the drawing, each of the eNode B 205 and the relay node 210 includes a plurality of antennas. Therefore, each of the eNode B 205 and the relay node 210 of the present invention supports an MIMO (multiple input multiple output) system. In addition, the eNode B 205 according to the present invention may support both SU-MIMO (single user-MIMO) and MU-MIMO (multi user-MIMO) systems.

In downlink, the transmitted data processor 215 receives traffic data, codes the received traffic data by formatting the received traffic data, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 225. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 225 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the relay node via the antenna 230.

In the configuration of the relay node 210, the antenna 235 receives the downlink signal from the eNode B and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, performs data demodulation on the received data symbols, obtains data symbol estimated values (i.e., estimated values of the transmitted data symbols), and then provides the data symbols estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the eNode B 205, respectively.

In the relay node 210 in uplink, the transmitted data processor 265 processes the traffic data and then provides data symbols. The symbol modulator 270 receives the data symbols, multiplexes the received data symbols, performs modulation on the multiplexed symbols, and then provides a stream of the symbols to the transmitter 275. The transmitter 275 receives the stream of the symbols, processes the received stream, and generates an uplink signal. This uplink signal is then transmitted to the eNode B 205 via the antenna 135.

In the eNode B 205, the uplink signal is received from the relay node 210 via the antenna 230. The receiver 290 processes the received uplink signal and then obtains samples. Subsequently, the symbol demodulator 295 processes the samples and then provides pilot symbols received in uplink and a data symbol estimated value. The received data processor 297 processes the data symbol estimated value and then reconstructs the traffic data transmitted from the relay node 210.

The processor 255/280 of the relay node/eNode B 210/205 directs operations (e.g., control, adjustment, management, etc.) of the relay node/eNode B 210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof. In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like.

In case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio protocol between a relay node and an eNode B may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A relay node and an eNode B may be able to exchange RRC messages with each other via radio communication layer and RRC layers.

Figure 3:
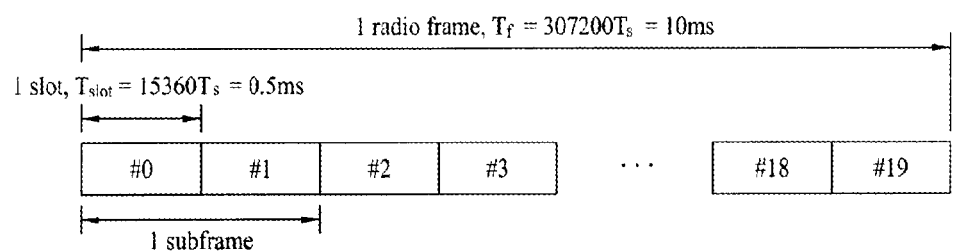
FIG. 3 is a diagram for one example of a structure of a radio frame used in 3GPP LTE system as one example of a mobile communication system.

FIG. 3 is a diagram for one example of a structure of a radio frame used in 3GPP LTE system as one example of a mobile communication system.

Referring to FIG. 3, one radio frame has a length of 10 ms ($327,200 \cdot T_s$) and is constructed with 10 subframes in equal size. Each of the subframes has a length of 1 ms and is constructed with two slots. Each of the slots has a length of 0.5 ms ($15,360 \cdot T_s$). In this case, $T_s$ indicates a sampling time and is expressed as $T_s = 1/(15\ kHz \times 2,048) = 3.2552 \times 10^{-8}$ (about 33 ns). The slot includes a plurality of OFDM symbols or SC-FDMA symbols in a time domain and also includes a plurality of resource blocks (RBs) in a frequency domain.

In the LTE system, one resource block (RB) includes '12 subcarriers×7 or 6 OFDM or SC-FDMA (single carrier-frequency division multiple access) symbols'. A transmission time interval (hereinafter abbreviated TTI), which is a unit time for transmitting data, can be determined by at least one subframe unit. The above-described structure of the radio frame is just exemplary. And, the number of subframes included in a radio frame, the number of slots included in a subframe and/or the number of OFDM or SC-FDMA symbols included in a slot may be modified in various ways.

Figure 4:
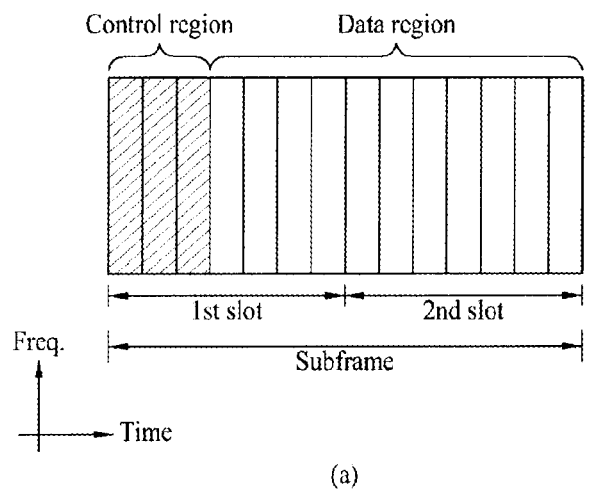
FIG. 4 is a diagram for structures of downlink and uplink subframes in 3GPP LTE system as one example of a mobile communication system.
Figure 4:
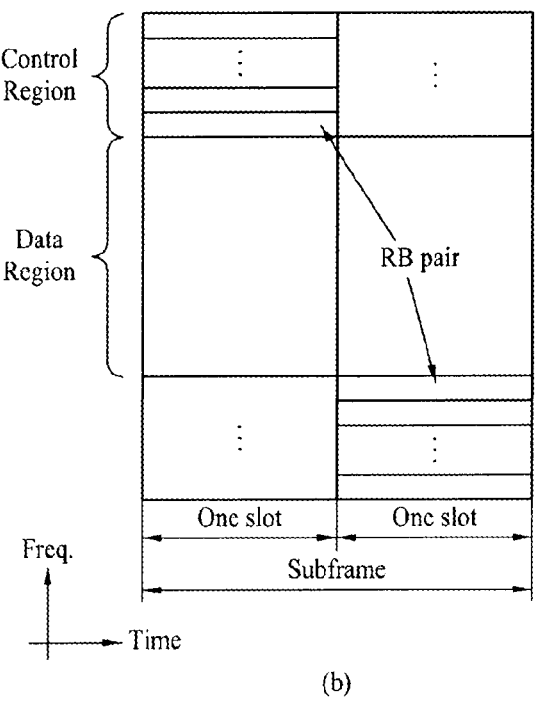

FIG. 4 is a diagram for structures of downlink and uplink subframe in 3GPP LTE system as one example of a mobile communication system.

Referring to FIG. 4 (a), one downlink (hereinafter abbreviated DL) subframe includes 2 slots in a time domain. Maximum 3 fore OFDM symbols of the first slot within the DL subframe correspond to a control region for allocating control channels thereto and the rest of the OFDM symbols correspond to a data zone for allocating PDSCH (physical downlink shared channel) thereto.

DL (downlink) control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol carries the information on the number of OFDM symbols (i.e., a size of a control region) used for the transmission of control channels within a subframe. The control information carried on the PDCCH is called downlink control information (hereinafter abbreviated DCI). The DCI indicates a UL resource allocation information, a DL resource allocation information, a UL transmission power control command for random user equipment groups and the like. The PHICH carries ACK/NACK (acknowledgement/not-acknowledgement) signal for UL HARQ (hybrid automatic repeat request). In particular, the ACK/NACK signal for UL data transmitted by a user equipment is carried on PHICH.

In the following description, PDCCH of DL physical channel is explained.

First of all, an eNode B is able to transmit resource allocation and transmission format (this is so-called DL grant) of PDSCH, resource allocation information (this is so-called UL grant) of a physical UL shared channel, an aggregation of transmission power control commands for a random user equipment and individual user equipments in a group, activation of VoIP (voice over internet protocol) and the like via PDCCH. A plurality of PDCCHs may be transmitted within a control region and a user equipment may be able to monitor a plurality of the PDCCHs. The PDCCH is constructed with aggregation of one or several contiguous CCEs (control channel elements). The PDCCH constructed with the aggregation of one or several CCEs may be transmitted via the control region after completion of subblock interleaving. The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

The control information carried on the PDCCH may be called DL control information (hereinafter abbreviated DCI). Table 1 shows the DCI according to DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates UL resource allocation information, DCI format 1~2 indicates DL resource allocation information, and DCI format 3 or 3A indicates a transmission power control (hereinafter abbreviated TPC) command for random UE groups.

A scheme for an eNode B to map a resource for PDCCH transmission in LTE system is schematically described as follows.

Generally, an eNode B may be able to transmit scheduling allocation information and other control informations via PDCCH. A physical control channel may be transmitted as one aggregation or a plurality of contiguous control channel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{CCE}$-1', where $N_{CCE}=\lfloor N_{REG}/9 \rfloor$. The PDCCH supports such a multiple format as shown in Table 2. One PDCCH including n contiguous CCEs starts with a CCE that executes 'i mod n=0', where 'i' is a CCE number. Multiple PDCCHs may be transmitted in one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, an eNode B is able to determine a PDCCH format in accordance with how many regions will receive control information and the like. And, a user equipment is able to reduce overhead by reading the control information and the like by CCE unit. Likewise, a relay node may be able to read control information and the like by R-CCE unit. In LTE-A system, it may be able to map a resource element (RE) by R-CCE (relay-control channel element) unit in order to transmit R-PDCCH for a random relay node.

Referring to FIG. 4 (b), a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single charier property, one user equipment does not transmit PUCCH and PUSCH simultaneously. PUCCH for one user equipment is allocated as an RB pair in one subframe. RBs belonging to the RB pair occupy different subcarriers in two slots, respectively. And, frequency hopping is performed on the RB pair allocated to the PUCCH on a slot boundary.

Figure 5:
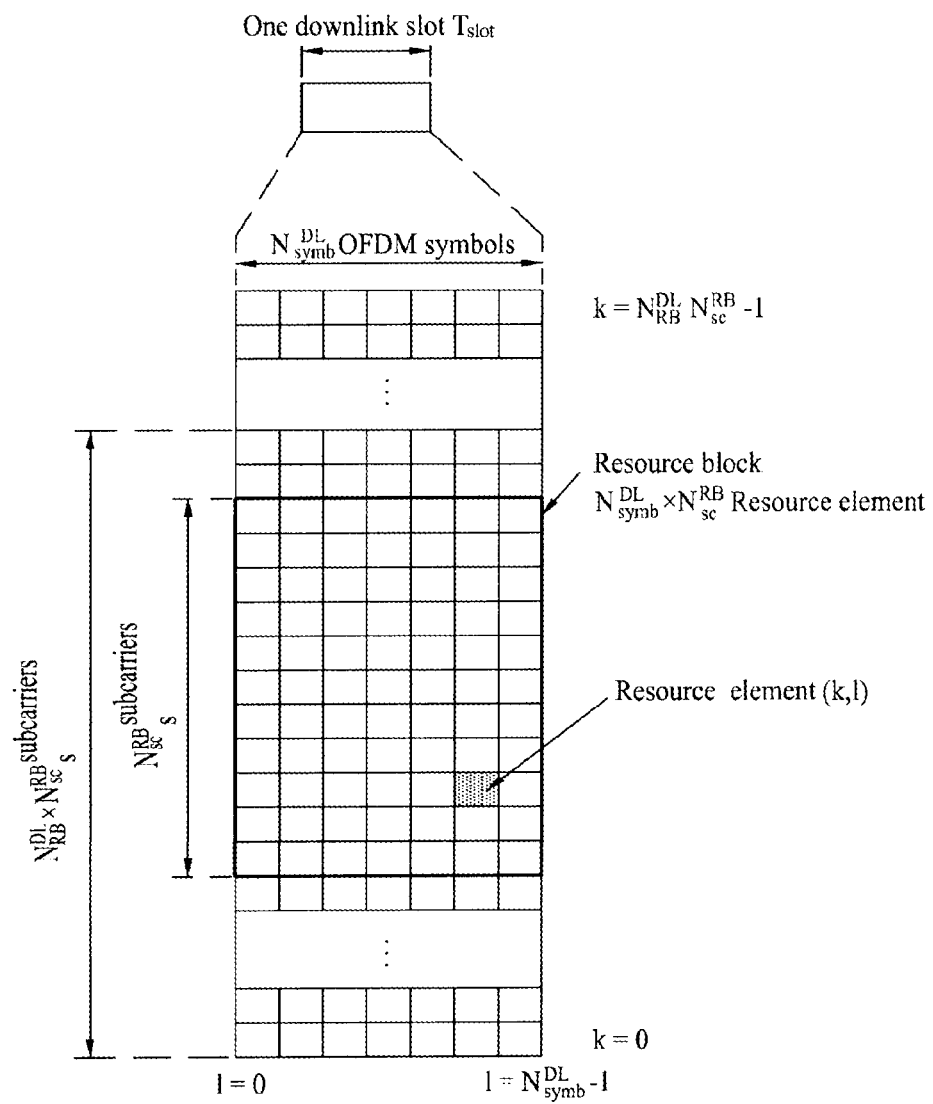
FIG. 5 is a diagram of a DL time-frequency resource grid structure used by the present invention.

FIG. 5 is a diagram of a downlink time-frequency resource grid structure used by the present invention.

A DL signal transmitted in each slot uses a resource grid structure constructed with $N_{RB}^{DL} \times N_{SC}^{RB}$ subcarriers and $N_{symb}^{DL}$ OFDM (Orthogonal Frequency Division Multiplexing) symbols. In this case, '$N_{RB}^{DL}$' indicates the number of resource blocks (RBs) in DL, '$N_{SC}^{DL}$' indicates the number of subcarriers constructing one RB, and '$N_{symb}^{DL}$' indicates the number of OFDM symbols in one DL slot. A size of '$N_{RB}^{DL}$' varies in accordance with a DL transmission bandwidth configured within a cell and should meet '$N_{RB}^{min,DL} \leq N_{RB}^{DL} \leq N_{RB}^{min,DL}$'. In this case, '$N_{RB}^{min,DL}$' is a smallest DL bandwidth supported by a wireless communication system and '$N_{RB}^{max,DL}$' is a greatest DL bandwidth supported by the wireless communication system. It may become '$N_{RB}^{min,DL}=6$' and '$N_{RB}^{max,DL}=110$', by which the present example is non-limited. The number of the OFDM symbols included in one slot can vary in accordance with a length of a CP (cyclic prefix) and an interval of subcarrier. In caser of multi-antennal transmission, one resource grid can be defined for each antenna port.

Each element within the resource grid for each antenna port is called a resource element (hereinafter abbreviated RE) and is uniquely identified by an index pair (k, l) within a slot. In this case, 'k' is an index in a frequency domain and 'l' is an index in a time domain. The 'k' has a value selected from '0, . . . , $N_{RB}^{DL} N_{RB}^{DL}$-1' and the 'l' has a value selected from '0, . . . , $N_{symb}^{DL}$-1'.

The resource block shown in FIG. 5 is used to describe the mapping relation between a prescribed physical channel and resource elements. Resource blocks can be classified into physical resource blocks (PRBs) and virtual resource blocks (VRBs). One PRB can be defined by $N_{symb}^{DL}$ contiguous OFDM symbols in time domain and $N_{SC}^{RB}$ contiguous subcarriers in frequency domain. In this case, '$N_{symb}^{DL}$' and '$N_{SC}^{RB}$' can be given as shown in Table 3. Hence, one PRB is constructed with '$N_{symb}^{DL} \times N_{SC}^{RB}$' resource elements. One PRB corresponds to one slot in time domain and also corresponds to 180 kHz in frequency domain, by which the present example is non-limited.

TABLE 3

| Configuration | | $N_{sc}^{RB}$ | $N_{symb}^{DL}$ |
|---|---|---|---|
| Normal | | | |
| cyclic prefix | Δf = 15 kHz | 12 | 7 |
| Extended | | | |
| cyclic prefix | Δf = 15 kHz | | 6 |
| | Δf = 7.5 kHz | 24 | 3 |

PRB has a value ranging 0 to '$N_{RB}^{DL}$-1' in frequency domain. The relation between the PRB number ($n_{PRB}$) in frequency domain and the resource element (k, l) in one slot satisfies $$n_{PRB} = \left\lfloor \frac{k}{N_{sc}^{RB}} \right\rfloor,$$

In this case, a size of the VRB is equal to that of PRB. The VRB can be defined in a manner of being categorized into a localized VRB (hereinafter abbreviated LVRB) and a distributed VRB (hereinafter abbreviated DVRB). For the VRB of each type, a single VRB number '$n_{VRB}$' is allocated to a pair of VRBs in two slots within one subframe.

The VRB may have a size equal to that of the PRB. VRBs of two types may be defined as follows. First of all, the first type is the localized VRB (LVRB). And, the second type is the distributed VRB (DVRB). For the VRB of each of the types, a pair of VRBs are allocated across two slots of one subframe with a single VRB index (hereinafter named a VRB number). In particular, one index selected from the group consisting of 0 to '$N_{RB}^{DL}$-1' is allocated to $N_{RB}^{DL}$ VRBs belonging to a first one of the two slots constructing one subframe. And, one index selected from the group consisting of 0 to '$N_{RB}^{DL}$-1' is allocated to $N_{RB}^{DL}$ VRBs belonging to a second one of the two slots constructing one subframe as well.

As mentioned in the foregoing description with reference to FIGS. 3 to 5, the radio frame structure, the DL and UL subframes, the downlink time-frequency resource grid structure and the like may be applicable between an eNode B and a relay node.

In the following description, a process for an eNode B to send PDCCH to a user equipment in downlink is explained. First of all, an eNode B determines a PDCCH format in accordance with a DCI (downlink control information) which is to be sent to a user equipment and then attaches a CRC (cyclic redundancy check) to a control information. In this case, the CRC is masked with a unique identifier, which will be called a radio network temporary identifier (hereinafter abbreviated RNTI), in accordance with an owner or usage of PDCCH. If the PDCCH is provided for a specific user equipment, the CRC can be masked with a unique identifier of a user equipment, e.g., C-RNTI (cell-RNTI). If the PDCCH is provided to a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a user equipment, the CRC can be masked with RA-RNTI (random access-RNTI). Table 4 shows examples of an identifier that masks PDCCH.

TABLE 4

| Type | Identifier | Description |
| --- | --- | --- |
| UE-specific | C-RNTI | used for the UE corresponding to the C-RNTI. |
| Common | P-RNTI | used for paging message. |
|  | SI-RNTI | used for system information (It could be differentiated according to the type of system information). |
|  | RA-RNTI | used for random access response (It could be differentiated according to subframe or PRACH slot index for UE PRACH transmission). |
|  | TPC-RNTI | used for uplink transmit power control command (It could be differentiated according to the index of UE TPC group). |

If C-RNTI is used, PDCCH carries a control information for a corresponding specific user equipment. If a different RNTI is used, PDCCH carries a shared control information received by all or a plurality of user equipments within a cell. The eNode B generates a coded data by performing a channel coding on the CRC attached DCI. The bas station then performs a rate matching according to the number of CCEs allocated to the PDCCH format. Subsequently, the eNode B generates modulated symbols by modulating the coded data. Thereafter, the eNode B maps the modulated symbols to the physical resource elements.

R-PDCCH (relay-physical downlink control channel) used by the present invention may be used to mean a backhaul physical downlink control channel for a relay transmission from an eNode B to a relay node. And, R-PUCCH (relay-physical uplink control channel) used by the present invention may be used to mean a backhaul physical uplink control channel for a relay transmission to an eNode B from a relay node. R-PDSCH (relay-physical downlink shared channel) may be used to mean a backhaul downlink physical data/shared channel for a relay transmission. And, R-PUSCH (relay-physical uplink shared channel) may be used to mean a backhaul uplink physical data/shared channel for a relay transmission.

Moreover, a relay node used by the present invention is assumed as Half-Duplex relay node incapable of simultaneously interactive transmission/reception on the same band. Yet, the relay node used by the present invention may be non-limited by the Half-Duplex relay node.

In the following description, explained is a method for allocating a resource for R-PDCCH which is a new DL control channel to support a relay node in LTE-A system. In particular, in viewpoint of multiplexing between R-PDSCH (relay-physical downlink shared channel) (i.e., a downlink data channel for a relay node) and PRSCH (physical downlink shared channel) for macro UEs belonging to a donor cell proposed are a TDM/FDM (time division multiplexing/frequency division multiplexing) multiplexing scheme, an FDM-only multiplexing scheme and a hybrid multiplexing scheme of the two schemes.

First of all, how a user equipment in LTE system receives PDCCH is described as follows. A plurality of PDCCHs can be transmitted in one subframe and a user equipment monitors a plurality of the PDCCHs in each subframe. In this case, the 'monitoring' means that the user equipment attempts to decode each of the PDCCHs in accordance with a monitored PDCCH format. In the control region allocated within the subframe, an eNode B does not provide the user equipment with information indicating where the corresponding PDCCH is located. The user equipment searches the PDCCH of its own by monitoring a set of PDCCH candidates in the subframe. This is called blind decoding. For instance, if CRC error is not detected from demasking the corresponding PDCCH from its C-RNTI, the user equipment may detect the PDCCH as having a DCI of the user equipment.

In order to receive DL data, a user equipment preferentially receives downlink (DL) resource allocation on PDCCH. If detection of PDCCH is successfully completed, the user equipment reads a DCI on the PDCCH. Using the DL resource allocation in the DCI, the user equipment may receive DL data on PDSCH. In order to transmit UL data, the user equipment preferentially receives UL resource allocation on PDCCH. If detection of PDCCH is successfully completed, the user equipment reads a DCI on the PDCCH. Using the UL resource allocation in the DCI, the user equipment may transmit UL data on PUSCH.

In the following description, a process for a relay node to receive control information from an eNode B is explained. First of all, an R-PDCCH search space may mean a space for a relay node to search to receive control information sent down on R-PDCCH from an eNode B. A donor base station (hereinafter called an eNode B) may be able to set up an R-PDCCH search space for each relay node. An eNode B may be able to set up an R-PDCCH search space donor-cell-specifically in form of a common search space for all relay nodes within a donor cell. In this case, every relay node within the donor cell may perform a blind search to receive control information in the common search space.

An eNode B may be able to transmit such R-PDCCH as a DL grant, a UL grant, a TPC (transmit power control) command and the like to each relay node via a common search space in a manner of CRC (cyclic redundancy check) masking the R-PDCCH with a relay node ID (identifier). The eNode B transmits R-PDSCH assignment information for cell-specific system information transmission in a manner of CRC masking the R-PDSCH assignment information with a relay node common ID (similar to SI-RNTI of LTE system).

On the other hand, an eNode B may be able to set up an RN-specific search space.

An eNode B may be able to set up a search space for R-PDCCH in frequency domain by unit of PRB (physical resource block), configured semi-statically by a higher layer signaling. PRBs, on which R-PDCCH transmission is not actually performed, among PRBs (hereinafter named a relay zone) semi-statically configured for the R-PRCCH transmission may be used for PRSCH transmission for a macro UE or R-PRSCH transmission for a relay node.

In the following description, a case for an eNode B to transmit R-PDCCH for a specific relay node is explained as follows. First of all, an eNode B may be able to transmit at least one R-PDCCH for a specific relay node. In doing so, the eNode B may be able to transmit the at least one R-PDCCH for the specific relay node in a manner of multiplexing the at least one R-PDCCH by TDM using the same RB or OFDM symbols contiguous in the same RB pair. For instance, an eNode B transmits a $1^{st}$ R-PDCCH in a given RB pair through 4 OFDM symbols corresponding to OFDM symbol indexes 3 to 6 of a $1^{st}$ slot and also transmits a $2^{nd}$ R-PDCCH in a $2^{nd}$ slot of the corresponding RB pair. In this case, a plurality of R-PDCCHs may include R-PDCCHs using different formats.

For instance, formats of a plurality of R-PDCCHs may include R-PDCCH format 1 for transmitting a DL grant which is control information necessary for an eNode B to transmit data to a relay node, R-PDCCH format 2 for transmitting a DL grant which is control information necessary for an eNode B to transmit data to a relay node, and R-PDCCH format 0 for transmitting a UL grant which is control information necessary for a relay node to transmit data to an eNode B. In this case, the DL grant may be transmitted in a manner of being assigned to a $1^{st}$ slot and the UL grant may be transmitted in a manner of being assigned to a $2^{nd}$ slot contiguous with the $1^{st}$ slot. In particular, the eNode B transmits the DL grant via 4 contiguous OFDM symbols having OFDM symbol indexes 3 to 6 in the $1^{st}$ slot and also transmits the UL grant via 7 contiguous OFDM symbols having OFDM symbol indexes 7 to 13 in the $2^{nd}$ slot.

When an eNode B transmits at least one R-PDCCH to a specific relay node, the corresponding relay node may know an RB position, on which one R-PDCCH is carried toward the corresponding relay node, through a blind search for another R-PDCCH. In particular, the R-PDCCH toward the corresponding relay node may be multiplexed by TDM scheme through an OFDM symbol adjacent to the same frequency position.

In case that a relay node detects one R-PDCCH, the relay node may be set to perform blind decoding on contiguous OFDM symbols one more time. If the relay node succeeds in additional R-PDCCH reception of a different format through the blind decoding of the contiguous OFDM symbols, the relay node may be able to another blind decoding on next contiguous OFDM symbols. Subsequently, the relay node may be able to continue performing the blind decoding until failing in additional R-PDCCH detection from the corresponding RB pairs.

In the following description, a method for an eNode B to transmit R-PDCCH for a relay node is explained with reference to the accompanying drawing.

Figure 6:
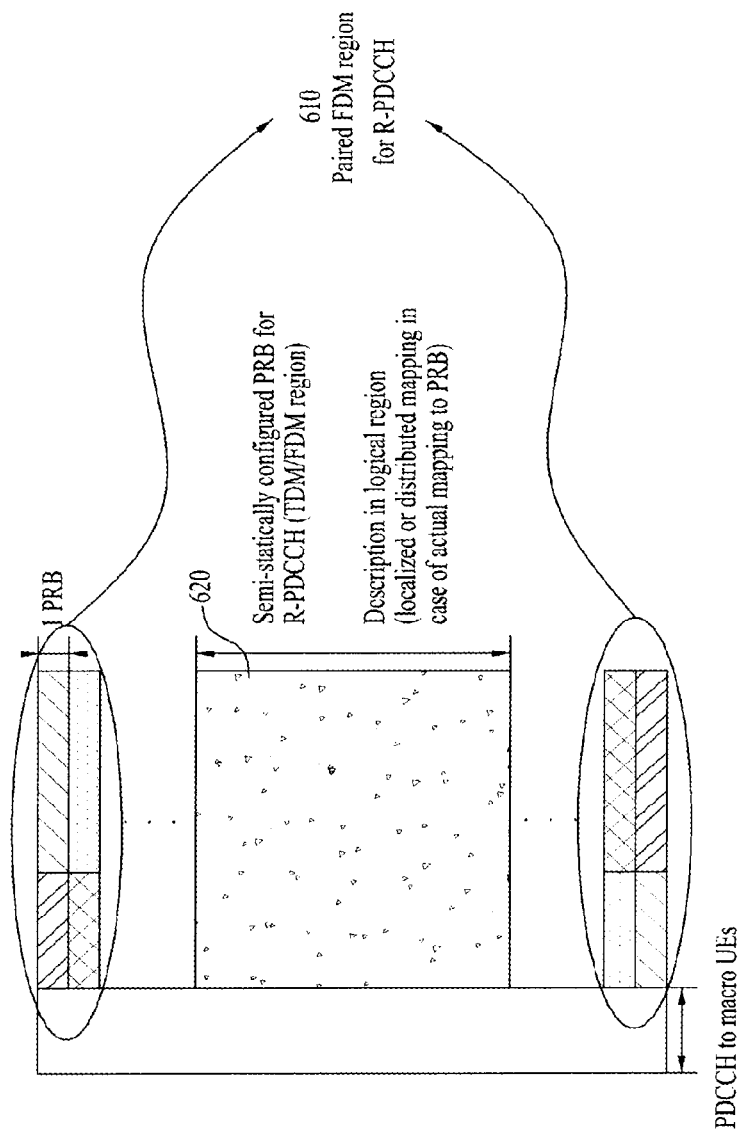
FIG. 6 is a diagram for one example of a multiplexing scheme for an eNode B to transmit R-PDCCH in a specific backhaul subframe to a relay node.

FIG. 6 is a diagram for one example of a multiplexing scheme for an eNode B to transmit R-PDCCH in a specific backhaul subframe to a relay node.

Referring to FIG. 6, an eNode B transmits R-PDCCH on both edge bands of a DL frequency band in a manner of multiplexing the R-PDCCH by FDM. And, the eNode B may be able to transmit R-PDCCH in a semi-statically configured relay zone by multiplexing the R-PDCCH by TDM/FDM. A start point OFDM symbol for an R-PDCCH transmission of an eNode B may be fixed to a $4^{th}$ symbol (i.e., symbol of an index 3) in each of an FDM region 610 and a TDM/FDM region 620.

A start point OFDM symbol of R-PDCH may be set in accordance with an RB size of a DL frequency band. For instance, if a DL frequency band is equal to or greater than 10 RBs (resource blocks), a start point of R-PDCCH may be set to a $4^{th}$ OFDM symbol of a $1^{st}$ slot. For another instance, if a DL frequency band is smaller than 10 RBs (resource blocks), a start point of R-PDCCH may be set to a $5^{th}$ OFDM symbol.

Alternatively, in accordance with a PDCCH size of MBSFN (multimedia broadcast multicast service single frequency network) subframe set up by a relay node or a PDCCH size of an eNode B, an R-PDCCH start point OFDM symbol may be semi-statically configured through a higher layer signaling. In this case, the R-PDCCH start point OFDM symbol may be set to a $3^{rd}$ OFDM symbol.

On the other hand, a start point of an R-PDCCH transmission may be fixed to a $4^{th}$ OFDM symbol of a $1^{st}$ slot in which a reception of a relay node is secured irrespective of a DL frequency band (bandwidth). Moreover, a time domain size of R-PDCH of the TDM/FDM region 620 or an OFDM symbol for an R-PDCCH transmission may be fixed cell-specifically or RN-specifically or may be configured semi-statically through a higher layer signaling.

According to one embodiment of the above description, a final symbol of a $1^{st}$ slot is determined as a final OFDM symbol for an R-PDCCH transmission or the number of symbols used for the R-PDCCH transmission may be set to 2 OFDM symbols (i.e., $4^{th}$ and $5^{th}$ OFDM symbols of the $1^{st}$ slot) of the $1^{st}$ slot, by R-REG (Relay-Resource Element Group) and R-CCE (Relay-Control Channel Elements) setup schemes. Although one example of the R-PDCCH size and end point has been described, a different size of the R-PDCCH may be set or the end point of the R-PDCCH may be set to another position.

Referring to FIG. 6, an end point of the R-PDCCH of the FDM region 610 established at the frequency band edge may be set as a final symbol of a corresponding backhaul subframe. If a final symbol is set as a guard period for RF switching (i.e., a switching for a relay node to switch a receiving mode to a transmitting mode), the end point may be set to a symbol right previous to the final symbol. One R-PDCCH in the FDM region 610 shown in FIG. 6, may be transmitted in a manner of slot boundary hopping.

Figure 7:
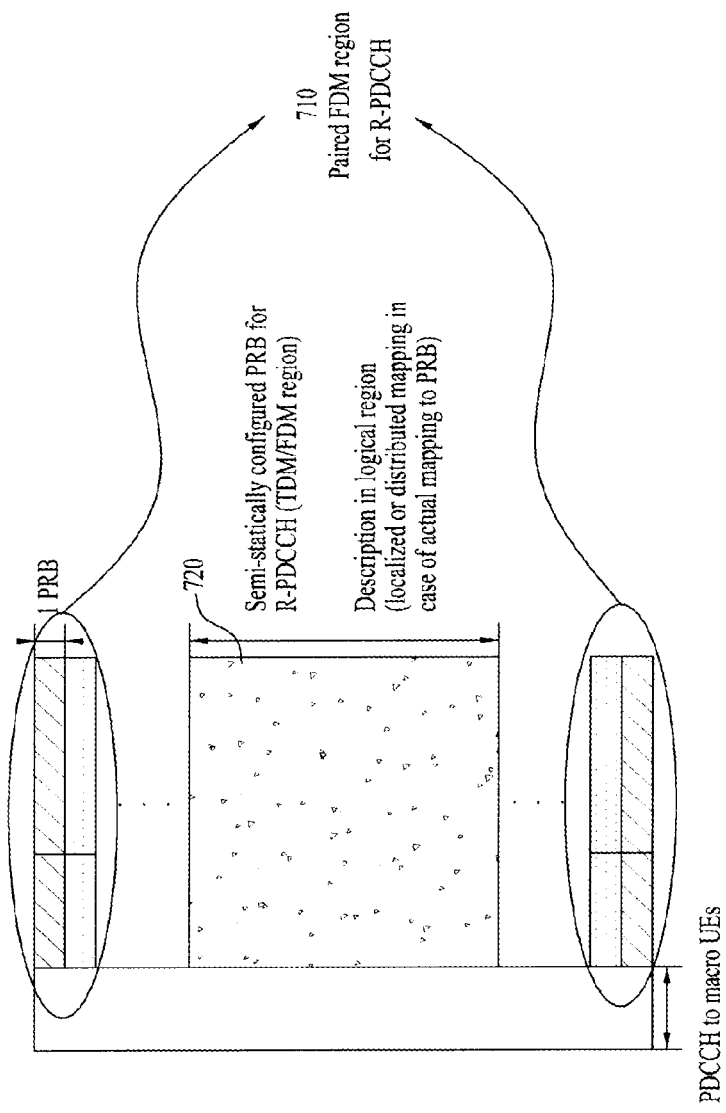
FIG. 7 is a diagram for one example of a multiplexing scheme for an eNode B to transmit R-PDCCH in a specific backhaul subframe to a relay node.

FIG. 7 is a diagram for one example of a multiplexing scheme for an eNode B to transmit R-PDCCH in a specific backhaul subframe to a relay node.

Referring to FIG. 7, like FIG. 6, an eNode B transmits R-PDCCH on both edge bands of a DL frequency band in a manner of multiplexing the R-PDCCH by FDM. And, the eNode B may be able to transmit R-PDCCH in a semi-statically configured relay zone by multiplexing the R-PDCCH by TDM/FDM. A start point OFDM symbol for an R-PDCCH transmission of an eNode B may be fixed to a $4^{th}$ symbol (i.e., symbol of an index 3) in each of an FDM region 710 and a TDM/FDM region 720.

In the FDM region 710, the eNode B may be able to transmit R-PDCCHs to a relay node by interleaving the R-PDCCHs through the same symbols in two PRBs paired together. When R-CCE is mapped to RE (resource element), mapping may be preferentially performed on a time axis or a frequency axis except REs used as a reference signal.

Unlike FIG. 6 or FIG. 7, an eNode B may be able to transmit R-PDCCH in a manner of multiplexing the R-PDCCH by FDM on both edge bands of a semi-statically configured relay zone instead of both edge bands of a DL frequency band and may be able to transmit R-PDCCH in a manner of multiplexing the R-PDCCH by TDM/FDM in an inner region of the relay zone. In this case, the transmission structure in the FDM region and the transmission structure in the TDM/FDM region are identical to those shown in FIG. 6 and FIG. 7.

An eNode B separately sets up a relay zone setup information containing an information on RBs semi-statically configured for the TDM/FDM region for carrying the TDM/FDM multiplexed R-PDCCH and a relay zone setup information containing an information on RBs semi-statically configured for the FDM region for carrying the FDM multiplexed R-PDCCH and may be then able to inform a relay node of the relay zone setup informations.

An eNode B transmits R-PDCCH and R-PDSCH in a manner of dynamically multiplexing the R-PDCCH and the R-PDSCH together by TDM/FDM in accordance with R-PDCCH transmission information for a relay node or multiplexing the R-PDCCH and the R-PDSCH together by FDM. In particular, when the eNode B transmits R-PDCCH for a random relay node, the eNode B transmits R-PDCCH in a $1^{st}$ slot of a specific PRB pair (i.e., $1^{st}$ slot and $2^{nd}$ slot of a specific backhaul subframe) only and R-PDSCH in the $2^{nd}$ slot or may not transmit any information in the $2^{nd}$ slot left in idle state.

Alternatively, the eNode B may transmit R-PDCCH in both of the $1^{st}$ slot and the $2^{nd}$ slot. Alternatively, the eNode B transmit R-PDCCH in the $2^{nd}$ slot only and R-PDSCH in the $1^{st}$ slot or the eNode B or may not transmit any information in the $1^{st}$ slot left in idle state. In doing so, a detailed method for an eNode B to transmit R-PDCCH is described as follows.

In the following description, first of all, a relay node, which uses DM RS (demodulation reference signal) as a reference symbol, is explained.

In case that a DL grant for a specific relay node exists in R-PDCCH only, an eNode B transmits the R-PDCCH (containing the DL grant) for the corresponding relay node in a $1^{st}$ slot of one random PRB or a plurality of physical resource blocks (PRBs) and may be able to transmit R-PDSCH for the corresponding relay node in a $2^{nd}$ slot of the PRB(s) having carried the R-PDCCH for the corresponding relay mode.

On the other hand, in case that both DL grant and UL grant for a specific relay node exist in R-PDCCH, an eNode B may be able to transmit R-PDCCH for a DL grant transmission of the corresponding relay node in a $1^{st}$ slot of one random PRB or a plurality of PRBs only. The eNode B transmits R-PDCCH for a UL grant transmission of the corresponding relay node in a remaining $2^{nd}$ slot of the PRB(s) having carried the R-PDCCH corresponding to the DL grant or in a $1^{st}$ slot of other PRB(s). In this case, the eNode B transmits R-PDSCH for the corresponding relay node in a remaining $2^{nd}$ slot of the PRB(s) having carried the DL grant or the UL grant or may irrespectively transmit the R-PDSCH for the corresponding relay node using other PRB(s).

In case that a UL grant for a specific relay node is carried on R-PDCCH only, an eNode B may be able to transmit R-PDCCH for the corresponding relay node by a PRB pair unit. In particular, the eNode B may be able to transmit a UL grant for the corresponding relay node in both a $1^{st}$ slot and a $2^{nd}$ slot of one random PRB or a plurality of PRB(s). Preferably, the eNode B may transmit the UL grant for the relay node in the $2^{nd}$ slot of the one random RPB or a plurality of the PRB(s) only.

In the following description, explained is a case that a relay node uses a CRS (common reference signal) as a reference symbol.

First of all, in case that a DL grant for a random relay node exists in R-PDCCH, an eNode B may be able to transmit R-PDCCH for the corresponding relay node in a $1^{st}$ slot of one random PRB or a plurality of PRB(s) only. In dong so, in a remaining $2^{nd}$ slot of the PRB(s) having carried the corresponding R-PDCCH, R-PDSCH for the corresponding relay node or R-PDCCH for another relay node may be transmitted.

In case that both a DL grant and a UL grant for a random relay node exit in R-PDCCH, an eNode B may transmit the R-PDCCH for a RL grant transmission of the corresponding relay node in a $1^{st}$ slot of one random PRB or a plurality of PRBs only. In dong so, the eNode B may be able to transmit the R-PDCCH for a UL grant transmission in a $2^{nd}$ slot of the PRBs remaining after the DL grant transmission. On the other hand, the eNode B may transmit the UL grant in a $2^{nd}$ slot of PRBs remaining after transmission of R-PDCCH for another relay node. Alternatively, the eNode B may be able to transmit the UL grant in a $1^{st}$ slot of PRBs other than the DL grant carried PRBs.

In case that a UL grant for a random relay node exists in R-PDCCH, an eNode B may have to transmit the R-PDCCH for a UL grant transmission of the corresponding relay node in a $2^{nd}$ slot of random PRB(s). In doing so, the eNode B uses a $1^{st}$ slot of the corresponding PRB(s) for the UL grant transmission of the corresponding relay node or a UL grant transmission of another relay node. Alternatively, the eNode B uses the $1^{st}$ slot of the corresponding PRB(s) for an R-PDSCH transmission of another relay node or may not transmit any information by leaving the $1^{st}$ slot in idle state.

An eNode B may inform each relay node of information on an FDM region for an R-PDCCH transmission together with relay node assignment information by RN-specific or cell-specific higher layer signaling. In doing so, the eNode B informs each relay node of a size of a frequency axis of the FDM region, i.e., the number of paired PRBs. In case shown in FIG. 6 or FIG. 7, the size of the corresponding FDM region becomes 2. Moreover, in case that the eNode B is able to set a slot hopping mode shown in FIG. 6 and an interleaving mode shown in FIG. 7 together, it may be able to inform each relay node of the setup information.

Scheme of R-PDCCH Transmission Via FDM Region and TDM/FDM Region

An eNode B may transmit an RN-specific DL grant via TDM/FDM region only and may also transmit an RN-specific UL grant and TPC command and a cell-specific (i.e., RN-common) DL grant (e.g., a DL grant for system information transmission, a DL grant for broadcast information transmission to all relay nodes or a relay node group) via FDM region only. The DL grant may be transmitted by being localized or distributed in the TDM/FDM region. The eNode B transmits R-PDSCH for the corresponding relay node on REs remaining in the RN-specific DL grant carried PRB(s) only. In doing so, the eNode B transmits the RN-specific DL grant using the same transmission mode (e.g., a precoding mode, a transmit diversity mode, etc.) of the corresponding R-PDSCH, which may be semi-statically settable for each relay node by higher layer signaling.

The R-PDCCH transmitted via the FDM region is transmitted by matching the transmission mode setup of the corresponding FDM region, which may be semi-statically settable together with the setup of the FDM region as well. For instance, when an eNode B simultaneously transmits a DL grant and a UL grant for one relay node via one backhaul subframe, the DL grant may be transmitted in the precoded transmission mode via the TDM/FDM region, while the UL grant is transmitted in the transmit diversity mode via the FDM region.

In case that a DL grant exists in R-PDCCH for a specific relay node, an eNode B transmits all R-PDCCHs (e.g., UL grant, TPC command, etc.) for the corresponding relay node via the TDM/FDM region. Only if a DL grant does not exist (e.g., a case that a UL grant or a TPC command exists only), the eNode B may be able to transmit R-PDCCH via the FDM region. The difference from the former case lies in that an RN-specific UL grant and TPC command may be transmitted via the TDM/FDM region in case of a presence of a DL grant for the corresponding relay node.

Alternatively, an eNode B may transmit all RN-specific R-PDCCHs via TDM/FDM region and may also transmit cell-specific (i.e., RN-common) R-PDCCH via FDM region.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a relay node device for receiving control information from an eNode B and method thereof are industrially applicable to such a communication system as 3GPP LTE, 3GPP LTE-A, IEEE 802 and the like.

What is claimed is:

1. A method of receiving signals by a communication apparatus in a wireless communication system, the method comprising:
receiving information related to resource assignment configured for control channel transmission for the communication apparatus from an eNode B;
receiving interleaving mode information indicating an interleaving mode applied to the at least one control channel for the communication apparatus from the eNode B;
receiving a first control channel including downlink (DL) grant from the eNode B through four symbols of a first slot in a subframe configured for the eNode B-to-the communication apparatus transmission based upon the information on resource assignment and the interleaving mode information; and
receiving a data channel associated with the first control channel from the eNode B through a second slot of the subframe.

2. The method of claim 1, wherein indexes of the four symbols of the first slot are represented as 3, 4, 5 and 6.

3. The method of claim 1, wherein the data channel is received through seven symbols of the second slot of the subframe.

4. The method of claim 1, wherein the communication apparatus comprises a relay node (RN), and
wherein the first control channel comprise relay physical downlink control channel (R-PDCCH).

5. The method of claim 1, wherein if the first control channel is received from the eNB through the first slot of the subframe, the data channel is not received from the eNB through the first slot of the subframe.

6. The method of claim 1, wherein the resource assignment is configured as resource block (RB) units.

7. The method of claim 1, further comprising:
receiving a second control channel including an uplink (UL) grant through the second slot of the subframe.

8. A communication apparatus of receiving signals in a wireless communication system, the communication apparatus comprising:
a receiver,
a processor configured to control an operation of the receiver,
wherein the receiver is configured to:
receive information related to resource assignment configured for control channel transmission for the communication apparatus from an eNode B;
receive interleaving mode information indicating an interleaving mode applied to the at least one control channel for the communication apparatus from the eNode B;
receive a first control channel including downlink (DL) grant from the eNode B through four symbols of a first slot in a subframe configured for the eNode B-to-the communication apparatus transmission based upon the information on resource assignment and the interleaving mode information; and
receive a data channel associated with the first control channel from the eNode B through a second slot of the subframe.

9. The communication apparatus of claim 8, wherein indexes of the four symbols of the first slot are represented as 3, 4, 5 and 6.

10. The communication apparatus of claim 8, wherein the receiver is further configured to receive the data channel through seven symbols of the second slot of the subframe.

11. The communication apparatus of claim 8, wherein the communication apparatus comprises a relay node (RN), and
wherein the first control channel comprise a first relay physical downlink control channel (R-PDCCH).

12. The communication apparatus of claim 8, wherein the resource assignment is configured as resource block (RB) units.

13. The communication apparatus of claim 8, wherein the receiver is further receive to receive a second control channel including an uplink (UL) grant through the second slot of the subframe.

14. A method of transmitting signals by an eNode B in a wireless communication system, the method comprising:
transmitting information related to resource assignment configured for control channel transmission for a communication apparatus to the communication apparatus;
transmitting interleaving mode information indicating an interleaving mode applied to the at least one control channel for the communication apparatus to the communication apparatus;
transmitting a first control channel including downlink (DL) grant through four symbols of a first slot in a subframe configured for the eNode B-to-the communication apparatus transmission to the communication apparatus in accordance with the information on resource assignment and the interleaving mode information; and
transmitting a data channel associated with the first control channel to the communication apparatus through a second slot of the subframe.

15. The method of claim 14, wherein the communication apparatus comprises a relay node (RN), and wherein the first control channel comprise a first relay physical downlink control channel (R-PDCCH).

16. The method of claim 14, wherein if the first control channel is transmitted through the first slot of the subframe, the data channel is not transmitted through the first slot of the subframe.

17. The method of claim 14, further comprising:
transmitting a second control channel including an uplink (UL) grant through the second slot of the subframe.

18. A eNode B of transmitting signals in a wireless communication system, the eNode B comprising:
a transmitter; and
a processor configured to control an operation of the transmitter,
wherein the transmitter is configured to:
transmit information related to resource assignment configured for control channel transmission for a communication apparatus to the communication apparatus;
transmit interleaving mode information indicating an interleaving mode applied to the at least one control channel for the communication apparatus to the communication apparatus;
transmit a first control channel including downlink (DL) grant through four symbols of a first slot in a subframe configured for the eNode B-to-the communication apparatus transmission to the communication apparatus in accordance with the information on resource assignment and the interleaving mode information; and
transmit a data channel associated with the first control channel to the communication apparatus through a second slot of the subframe.

19. The eNode B of claim 18, wherein the communication apparatus comprises a relay node (RN), and
wherein the control channel comprise relay physical downlink control channel (R-PDCCH).

20. The eNode B of claim 18, wherein if the transmitter transmits the first control channel through the first slot of the subframe, the transmitter is further configured not to transmit the data channel through the first slot of the subframe.

* * * * *